June 25, 1940.　　　A. F. CAPRIO ET AL　　　2,205,466
PROCESS FOR MAKING DECORATIVE MATERIAL
Filed Sept. 18, 1937
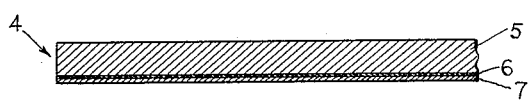
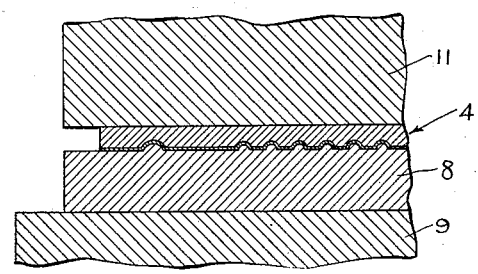
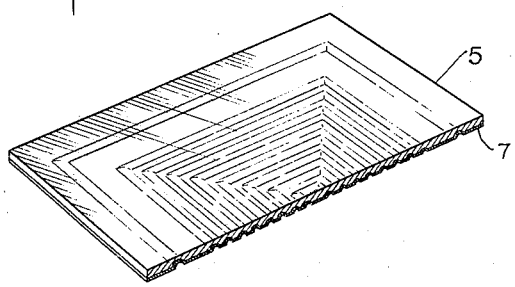
INVENTORS
A. F. CAPRIO
H. E. SMITH
ATTORNEYS Patented June 25, 1940

2,205,466

UNITED STATES PATENT OFFICE 2,205,466

PROCESS FOR MAKING DECORATIVE MATERIAL

Amerigo F. Caprio, Madison, and Harry E. Smith, Short Hills, N. J., assignors to Celluloid Corporation, a corporation of New Jersey Application September 18, 1937, Serial No. 164,522

8 Claims. (Cl. 41—22)

This invention relates to the production of decorative materials and particularly to the production of decorative materials containing thin metallic foils and plastic compositions comprising derivatives of cellulose.

It is an object of this invention to produce patterned or effect materials, sheets, slabs, or other articles or objects of any shape from plastic materials comprising derivatives of cellulose and relatively thin metallic foils.

Another object of this invention is the production of decorative effects with transparent and translucent thermoplastic materials having a backing of relatively thin metallic foil.

Still another object of this invention is the production of decorative articles comprising a relatively thin metallic foil with a backing or support of thermoplastic material, the decorative effect being on the metal side of the article.

A further object of this invention is to produce decorative articles comprising a reinforced plastic material, which articles are characterized by having improved heat and electricity conducting properties.

Other objects of our invention will be apparent from the following detailed description and the appended claims.

In the production of decorative articles of plastic materials containing derivatives of cellulose, the prior practice has been to first emboss the desired design on the plastic sheet material and then to spray onto the embossed surface a lacquer containing metallic or nacreous particles. Such prior process has many disadvantages. For example, the spraying lacquer frequently fails to fill properly all of the indentations of the embossed design. Due to the flowable liquid nature of the lacquer solution, the amount of metal particles deposited by the lacquer solution on the embossed plastic sheet material varies leaving grooves and ridges which are at least translucent. Attempts have been made to overcome this difficulty by applying to the coated embossed sheet material a backing of opaque material and by spraying additional lacquer solution onto the embossed surface.

When attempting to touch up weak or poorly coated areas by additional spraying, there results an aggravation of non-uniform deposit which leads to a distortion or buckling of the sheet in consequence of the non-uniform treatment with the lacquer containing strong-acting solvents. The spraying process, moreover, is often attended by considerable dust contamination. To minimize the buckling of the sheet material, highly volatile solvents are employed, but these solvents cause blushing at high humidity. Furthermore, the viscosity or flow of the solution must be very carefully controlled to prevent the settling of the metallic particles and also to obtain the optimum orientation of the scales on the surface of the sheet. The metallic particles in the lacquer spraying solution are often too coarse and because of this the valleys or grooves in certain of the embossed designs on the sheet material are not smoothly filled. Furthermore, the solvents act on the plastic sheet material, marring the fine lines or markings of the embossing. The spraying of the embossed sheet suffers from another difficulty in that the sprayed side is usually not usable from a decorative point of view as it does not present an attractive appearance and is readily soiled. In gluing or cementing this side to other objects, the lacquer coating is often "lifted" by the strong solvents which must be employed to obtain proper cementation. Moreover, the sprayed sheets of the prior art do not have the high degree of brilliancy which characterizes the plastic sheets containing a bright sheet of metal as a backing over substantially the entire surface.

In our invention the disadvantages previously encountered are avoided. According to our invention, we first coat one side of a plastic sheet with a layer of an adhesive composition and place the uncoated side on a nickel polishing plate. A thin sheet of metallic foil is placed on the coated surface of the derivative of cellulose sheet and then a metallic embossing plate is superposed on the loose metal foil. The above assembly is put into a hydraulic press and heat and pressure are applied, as in the usual manner of polishing and finishing pyroxylin sheets. In the compositing operation, the derivative of cellulose sheet and the metallic foil are cemented together and a design embossed all in a single step. Applicants made the surprising discovery that by their process a thin, easily broken non-plastic metallic foil can be pressed over a derivative of cellulose surface without fracturing or splitting the metallic foil, the metallic foil easily embedding itself into the derivative of cellulose sheet. Applicants also found that they could shape or mold decorative material made in accordance with their process without loss of any desirable effects.

In accordance with the process of the present invention, there is obtained a uniform, reinforced article of much beauty and luster, both sides of which can be used for their decorative value. A particularly desirable decorative article is one comprising a thin metallic foil composited with a backing or support of thermoplastic material in which the metal side presents the decorative effect. Such an article shows no wrinkling, buckling or unevenness, and the metal side of the same appears as a solid metal plate whose surface has been engraved. While a solid metal impression is created, the composited article is nevertheless pliable and can be readily shaped around wooden or other supports.

In our process no personal element enters in during the act of spraying, adjustment of lacquer viscosity and uniform application of coating. Every groove and turn is covered in the cementing and embossing operation. The sheet material produced in accordance with our invention can be stamped out or cut into various figurations and shapes without the fracturing of the metallic foil backing. Moreover, if it is desired, the metallic foil side may be made the base for the electrodeposition of metal to increase the thickness of the metal coating.

The thermoplastic material may contain any suitable derivative of cellulose, such as cellulose nitrate (pyroxylin) or organic derivatives of cellulose. The organic derivative of cellulose may be an organic ester of cellulose or a cellulose ether. Examples of organic esters of cellulose are cellulose acetate, cellulose formate, cellulose propionate and cellulose butyrate, while examples of cellulose ethers are methyl cellulose, ethyl cellulose and benzyl cellulose.

Beside the derivative of cellulose, the thermoplastic composition employed may contain softening agents or plasticizers, pigments, dyes, filling materials and/or stabilizers, such as urea, as is well understood in the art. Examples of plasticizers are camphor, castor oil, tricresyl phosphate, diethyl phthalate, dibutyl phthalate, dibutyl tartrate, paraethyl toluene sulfonamid, etc., the choice of which depends on the particular derivative of cellulose employed and on the particular use to which the thermoplastic composition is to be put.

Any thickness of the derivative of cellulose sheet may be employed in accordance with our invention. We prefer, however, to use a gauge of 0.015 to 0.020 of an inch or more. However, we have been able to use derivative of cellulose sheets as thin as 0.005 of an inch but these sheets offer difficulty in compositing and naturally lack the rigidity of the thicker sheets.

The adhesive composition employed in accordance with this invention is a thermoplastic or heat-sensitive cement comprising a thermoplastic synthetic resin and a cellulose derivative, such as cellulose nitrate. A preferred form of adhesive comprises a cellulose nitrate having a nitrogen content of 10 to 12.2% and a polyhydric alcohol-polybasic acid synthetic resin modified by a vegetable drying oil, semi- and non-drying oils or stearic acids or oleic acids, or higher alcohols, such as butyl and amyl alcohol, dispersed in a suitable solvent mixture. A suitable resin for use in making the thermoplastic cement is the reaction product of phthalic anhydride, glycerol and castor oil. Other adhesive or so-called "dry mount" compositions may also be used, for example, cellulose nitrate or cellulose acetate lacquer containing high proportions of plasticizers, i. e., on the order of 50 to 200 parts of plasticizer to 100 parts of cellulose derivative, and also some suitable gums or resins, such as ester gum, gum elemi, gum mastic and gum dammar. Resin lacquer not employing cellulose esters of ethers as a base may also be employed as an adhesive compound for the metallic foil. An example of such an adhesive compound is polymerized vinyl chloride, vinyl acetate, polymerized methyl methacrylate, polymerized styrol or mixtures of the same. However, the best results are obtained by the use of the thermoplastic cement as above described, namely, one made of cellulose nitrate and a synthetic resin, since such a cement has the property of drying almost dry to the touch, but softens or melts and becomes an excellent adhesive for the metallic foil to the derivative of cellulose plastic sheet upon the application of heat.

In carrying out our invention, we employ relatively thin metallic foil having a thickness on the order of 0.0005 to 0.001 of an inch, but preferably 0.0005 of an inch. While we prefer to use aluminum foil, the foil may be made of other materials, such as zinc, tin, lead, nickel, copper, or alloys, such as, brass, duralumin, etc. Moreover, the metallic foil may have a sheen on both sides, or may be dull on both sides, or may be dull on one side and shiny on the other, different effects, of course, being obtained by the use of these foils. In general, any metal or alloy may be employed provided it is soft enough to be embossed by the embossing plate. On the whole we prefer to use aluminum foil, as it is strong, light, and is capable of receiving a true impression from the embossing plate. The embossing plate may be one which is stamped or engraved in the usual manner. However, we may also use a photo-engraved plate made by etching with chemicals as is done in the photo-printing industry. Thus, besides lining or geometric effects, such as appear in engine-turning or cloisonne designs, we may produce articles having attractive pictorial representations.

We have also obtained highly desirable results by the use of metallized paper, i. e., metallic foil having a paper backing. The use of such paper produces a rather desirable wrinkled or stippled effect, due to the peculiar action of the paper under heat and pressure. The use of metallized paper has the advantage that the upper, or paper, side can readily be glued to paper, cardboard, fabric, wood, metal, etc., with ordinary glue, casein, or shellac.

Furthermore, a composite made of derivative of cellulose plastic sheet and metallic foil or metallized paper can be readily scored with a knife or razor blade and bent sharply without tearing completely through, the metallic foil or metallized paper preventing the pieces from falling apart. Many desirable display effects and cartons can be made from the composite of derivative of cellulose plastic sheet and metallic foil or metallized paper as the composite may be scored at different angles, then held together by any reinforcing means placed at the inside corners or edges which are concealed from view.

The derivative of cellulose plastic sheet or foil may be decorated, printed or colored, or have opaque portions thereon, to produce any desired effect. A fluorescent sheen, for example, may be obtained with dyes of the eosine or rhodamine type. Furthermore, the derivative of cellulose sheet may also be given an iridescent finish by rubbing it with bismuth oxychloride in the well known manner for producing iridescent effects. In this latter case, the thermoplastic cement should be one that will have no injurious solvent effect on the base carrying the iridescent substance. We also are able to produce other desirable decorative effects by inserting pieces or strings of lahn, tinsel and the like between the thermoplastic cement and the metallic foil. In this case, there is obtained a scintillating background. Also, by printing outlines of precious stones on the plastic sheet before compositing the same with the metallic foil, precious stone effects may be produced.

In accordance with our invention, we are able to simulate mother-of-pearl effects, ordinarily produced by fish scale, by the use of metallic foil. By incorporating a suitable pigment and color in the plastic sheet and backing the same with a sheet of metallic foil, we obtain the same optical effect, i. e., a white, lustrous, mother-of-pearl effect, as is obtained by the use of fish scale lacquer. In our process, it is not necessary to employ any nacreous materials, such as, for example, as fish scale essence, the silky variety of certain metallic salts, or the like.

Where it is desirable to use a printed derivative of cellulose sheet, we prefer to have the printing on the upper side of the sheet, that is, the side that is ordinarily exposed. To protect the printing, we composite to this printed surface a thin protective layer of derivative of cellulose foil, the compositing being effected during the cementing and embossing of the printed derivative of cellulose sheet to the metallic foil, the operative taking care that the printed design should properly register with the embossed design. With the use of certain adhesives, it is often necessary to apply the same to the metal sheet instead of to the printed plastic sheet in order to prevent bleeding of colors on such plastic sheet. The metallized derivative of cellulose sheet made in accordance with this invention has been found particularly satisfactory in making playing cards where opacity is mush desired. Our invention also lends itself to the production of articles in tubular or rod form by wrapping strips of the composite product around tubes or rods. Strips of our product may be also spirally wrapped and butt-welded for the making of fountain pen barrels and the like. In these operations, considerable stretching takes place but with care little or no fracture of the metal foil takes place. However, by increasing the stretching force, uniform fracture effects which are quite desirable may be obtained in the resulting product.

Many other desirable effects can be produced in accordance with this invention. For example, the derivative of cellulose sheet may be treated so that a matte finish may be obtained. Also in place of metal embossing plates, there may be used fabrics, such as linens, silks, moire materials, to produce fabric effects on the metal foil.

Our invention finds many useful applications in various fields. For example, it has been applied in the making of display signs, advertising matter, ornamental panels, tops of cosmetic containers, boxes of various kinds, coverings, pocket-books, buttons, buckles, novelties, molded letters and numbers, picture frames, emblems, ornamentations, etc. Our product has also been used for radio dials, clock dials, typewriter keys, imitation pearl, engine turning and cloisonne effects, lamp shades, etc. A particular application of our invention has been in the production of light reflectors or buttons for automobile tail lights, traffic signals and the like.

The manner in which the invention may be carried out in practice is illustrated in the following example, it being understood that this is in no way limitative and can be varied widely without departing from the invention.

*Example*

A relatively thin sheet of pyroxylin is coated with a cement which is thermoplastic in character and a sheet of aluminum foil having a thickness of 0.0005 of an inch, is then placed on said cement coated sheet, an embossing plate is superposed on the aluminum sheet, and the assembly is then subjected to the necessary application of pressure, for example, in a heated hydraulic press, to unite the aluminum foil and the pyroxylin sheet and, at the same time, emboss a design to form a decorative material.

The present invention will now be described with reference to the accompanying drawing wherein Figure 1 is a cross-sectional view of the superposed layers going into the laminated article produced in accordance with this invention;

Figure 2 is a fragmentary cross-sectional view of a press showing the layers being simultaneously united and having a design impressed on the metallic foil side, and Figure 3 is a cross-sectional view of the finished laminated article.

Like reference numerals indicate like parts throughout the several views of the drawing.

Referring to Figure 1 the superposed layers making up the article of this invention are generally indicated by reference numeral 4 and comprise a thermoplastic sheet 5, a layer of adhesive 6 and a sheet of thin metallic foil 7. These superposed layers are placed upon an embossing plate 8 in a heated hydraulic press comprising a platen member 9 and a vertically reciprocating pressing head 11. In this press the layers are simultaneously united and a design is impressed on the metallic foil in such a manner that the outer surface of the thermoplastic material is not distorted in any manner, as is shown in Figure 3.

It is to be understood, however, that instead of placing the layers of material on the embossing plate as is shown in Figure 2, the layers may be placed on the platen of the press with the metallic foil side uppermost and the embossing plate placed on top of the layers. The result would be the same in either case.

It is to be understood that the foregoing detailed description is given merely by way of illustration and that many variations may be made therein without departing from the spirit of our invention.

Having described our invention what we claim and desire to secure by Letters Patent is:

1. Method of producing decorative articles comprising metallic foil and thermoplastic material containing a derivative of cellulose, which comprises applying to the thermoplastic material a coating of adhesive, superposing a relatively thin metallic foil on said adhesive-coated thermoplastic material, and simultaneously uniting the metallic foil to the thermoplastic material and impressing a design on the metallic foil in such a manner that the outer surface of the thermoplastic material is maintained free from distortion.

2. Method of producing decorative articles comprising aluminum foil and thermoplastic material containing a derivative of cellulose, which comprises applying to the thermoplastic material a coating of adhesive, superposing a relatively thin aluminum foil on said adhesive-coated thermoplastic material, and simultaneously uniting the aluminum foil to the thermoplastic material and impressing a design on the aluminum foil in such a manner that the outer surface of the thermoplastic material is maintained free from distortion.

3. Method of producing decorative articles comprising aluminum foil and thermoplastic material containing a derivative of cellulose which comprises applying to the thermoplastic material a coating of adhesive containing a large amount of plasticizer for the derivative of cellulose of the thermoplastic material, superposing on said adhesive-coated thermoplastic material an aluminum foil having a thickness of about .0005 of an inch, and simultaneously uniting the aluminum foil to the thermoplastic material and impressing a design on the aluminum foil in such a manner that the outer surface of the thermoplastic material is maintained free from distortion.

4. Method of producing decorative articles comprising aluminum foil and thermoplastic material containing a derivative of cellulose which comprises applying to the thermoplastic material a coating of thermoplastic cement containing a large amount of plasticizer for the derivative of cellulose of the thermoplastic material, superposing on said cement-coated thermoplastic material an aluminum foil having a thickness of about .0005 of an inch, and simultaneously uniting the aluminum foil to the thermoplastic material and impressing a design on the aluminum foil in such a manner that the outer surface of the thermoplastic material is maintained free from distortion.

5. Method of producing decorative articles comprising metallic foil and thermoplastic material containing a derivative of cellulose, which comprises applying to the thermoplastic material a coating of adhesive, placing a sheet of relatively thin metallic foil on adhesive-coated thermoplastic material, superposing an embossing plate on the metallic foil, and applying heat and pressure to the assembly so as to cause the simultaneous uniting of the metallic foil to the thermoplastic material and the impressing of a design on the metallic foil in such a manner that the outer surface of the thermoplastic material is maintained free from distortion.

6. Method of producing decorative articles comprising aluminum foil and thermoplastic material containing a derivative of cellulose, which comprises applying to the thermoplastic material a coating of thermoplastic cement, placing a sheet of relatively thin aluminum foil on cement-coated thermoplastic material, superposing an embossing plate on the aluminum foil, and applying heat and pressure to the assembly so as to cause the simultaneous uniting of the aluminum foil to the thermoplastic material and the impressing of a design on the aluminum foil in such a manner that the outer surface of the thermoplastic material is maintained free from distortion.

7. Method of producing decorative articles comprising aluminum foil and thermoplastic material containing a derivative of cellulose, which comprises applying to the thermoplastic material a coating of thermoplastic cement containing a derivative of cellulose and a resin, placing a sheet of relatively thin aluminum foil on cement-coated thermoplastic material, superposing an embossing plate on the aluminum foil, and applying heat and pressure to the assembly so as to cause the simultaneous uniting of the aluminum foil to the thermoplastic material and the impressing of a design on the aluminum foil in such a manner that the outer surface of the thermoplastic material is maintained free from distortion.

8. Method of producing engine-turning designs on decorative articles comprising metallic foil and thermoplastic material containing a derivative of cellulose, which comprises applying to the thermoplastic material a coating of adhesive, placing a relatively thin metallic foil on said adhesive thermoplastic material, superposing on the metallic foil an embossing plate containing an engine-turning design and applying heat and pressure to the assembly so as to cause the simultaneous uniting of the metallic foil to the thermoplastic material and the impressing of the engine-turning design on the metallic foil in such a manner that the outer surface of the thermoplastic material is maintained free from distortion.

AMERIGO F. CAPRIO.
HARRY E. SMITH.